Figure 1:
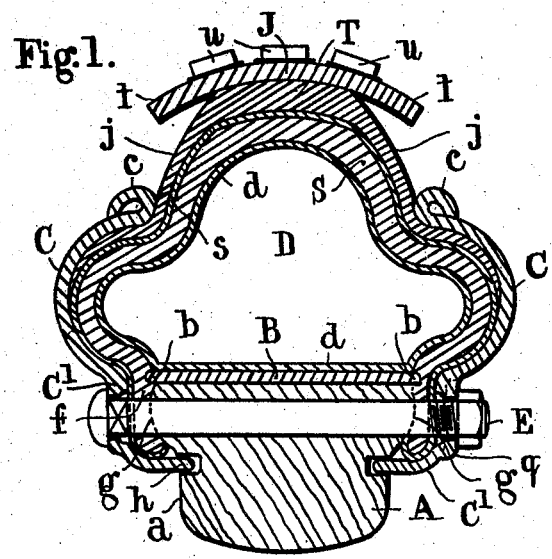

H. W. DOVER.
PNEUMATIC TIRE.
APPLICATION FILED APR. 8, 1907.

900,498.

Patented Oct. 6, 1908.

3 SHEETS—SHEET 1.

WITNESSES:

INVENTOR
Horace W. Dover
BY
ATTORNEYS

H. W. DOVER.
PNEUMATIC TIRE.
APPLICATION FILED APR. 8, 1907.

900,498.

Patented Oct. 6, 1908.

3 SHEETS—SHEET 2.

WITNESSES:
W. M. Avery
J. P. Davis

INVENTOR
Horace W. Dover
BY
Munn & Co.
ATTORNEYS

H. W. DOVER.
PNEUMATIC TIRE.
APPLICATION FILED APR. 8, 1907.

900,498.

Patented Oct. 6, 1908.

3 SHEETS—SHEET 3.

WITNESSES:
W. M. Avery
J. P. Davis

INVENTOR
Horace W. Dover
BY
Munn & Co
ATTORNEYS

UNITED STATES PATENT OFFICE.

HORACE WALTER DOVER, OF NORTHAMPTON, ENGLAND.

PNEUMATIC TIRE.

No. 900,498.   Specification of Letters Patent.   Patented Oct. 6, 1908.

Application filed April 8, 1907. Serial No. 366,985.

*To all whom it may concern:*

Be it known that I, HORACE WALTER DOVER, a subject of the King of Great Britain, and resident of Holyrood, St. James, Northampton, England, engineer, have invented certain new and useful Improvements in and Relating to Pneumatic Tires, of which the following is a specification.

This invention relates to improved means for securing pneumatic tires in position, and it has for its principal object to provide a construction whereby the tire will be so held that the effect of the internal pressure will be to cause the tire to become more securely fixed in position instead of tending to become detached by increase of its diameter as heretofore.

A further object of the invention is to prevent lateral rolling of the tire which, in the case of tires secured as at present, is liable to produce side slip and also cause the air tube to be nipped.

According to the present invention the wheel rim is provided with a pair of relatively deep side flanges whose free edges are directed towards one another so that the flanges embrace or overlap not merely the base but the body of the tire laterally, and expose between their free edges only the tread portion of the tire and the parts of the latter immediately adjacent to the tread.

The portions of the flanges which extend radially beyond the outer periphery of the rim may be first outwardly curved, so as to extend laterally to a greater width than the rim itself and thus afford protection to the nuts or heads of the transverse bolts or screws, and their outer portions are curved towards one another, their free edges being preferably strengthened by beadings.

The terminal portions of the flanges preferably extend towards one another so far as to overhang the peripheral face of the rim against which the base of the tire or air tube bears. These portions of the flanges are preferably parallel to the peripheral face of the wheel rim or may even be recurved towards the latter, so as to render it impossible for the tire to become blown off or otherwise accidentally separated from the wheel in the radial direction. This form of the flanges is adapted to permit of a removable wearing tread or an anti-skidding band being applied to the tread of the tire very readily, marginal extensions provided on such a band being tucked between the body of the tire and the flanges, which may be grooved, or provided with apertures or recesses, to receive beadings (wired or otherwise) or studs or other projections upon or near the lateral edges of the band.

The tire or cover instead of being approximately circular in cross section as hitherto, would be made of a configuration to fit the space which it is intended to fill, the body of the tire when inflated presenting shoulders adapted to engage beneath the inwardly curved flanges of the rim while the tread portion is adapted to project as already described between and beyond the edges of the flanges.

In cases where the invention is applied to a wheel having a broad tread, the construction may be as before described, a single pair of side flanges and a single tire cover being used, but the latter having two or more tread portions arranged side by side in parallel annuli. Each tread portion projects as before beyond the radial limits of the side flanges, and between each two adjacent tread portions the tire or cover is encircled by a floating band of inextensible metal, preferably convex inwardly in cross section, the external diameter of the band being equal or approximately equal to that of the side flanges.

The invention is illustrated in the accompanying drawings which consist of cross sectional views of various examples of wheel rims and tires embodying the principal improvements mentioned above.

Figure 2:
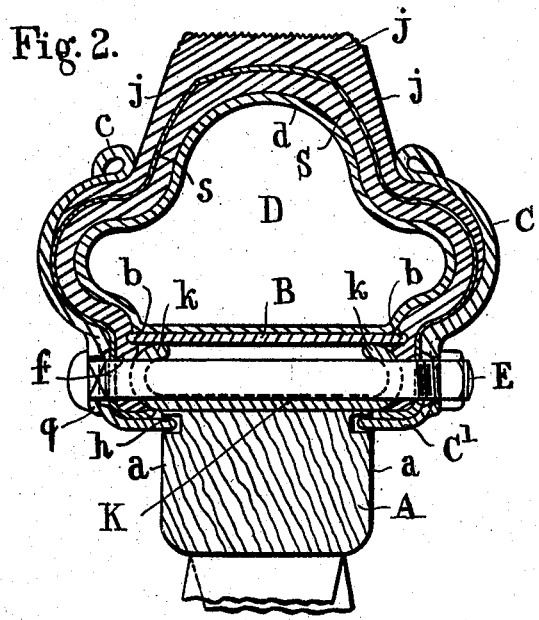
Figure 3:
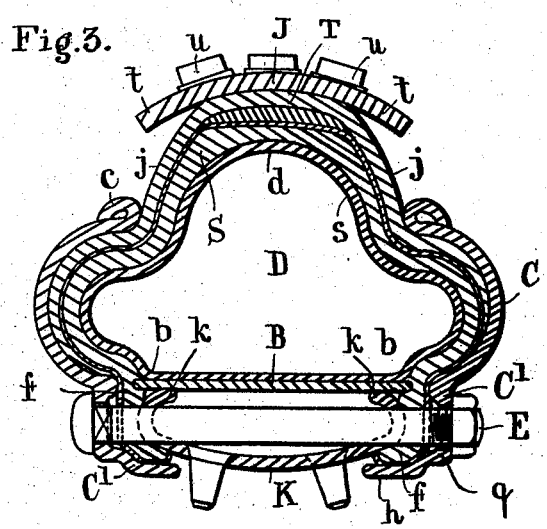
Figure 5:
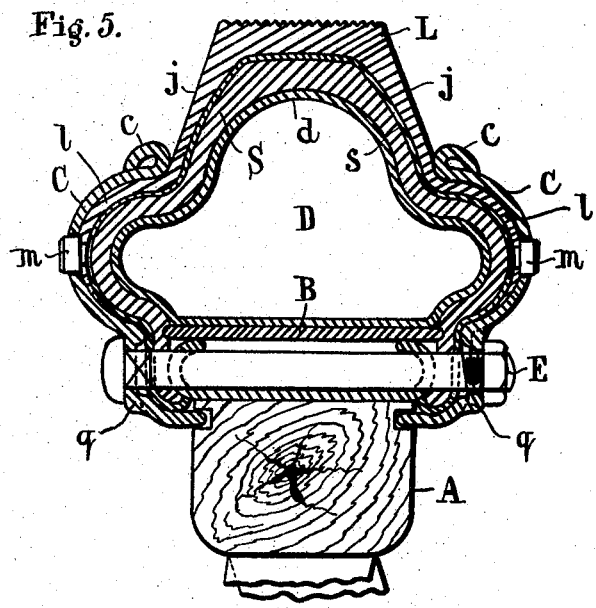
Figure 4:
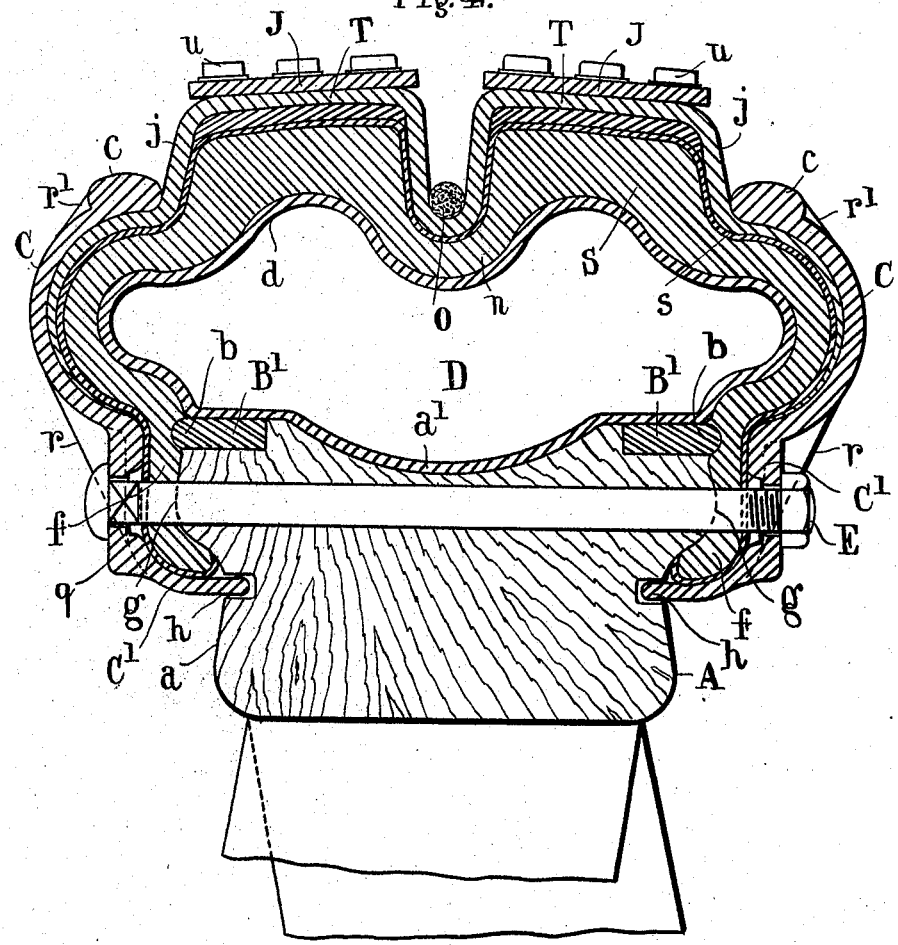

In these drawings Figure 1 shows the application of the invention to a so-called artillery wheel (*i. e.* one having a wooden felly). Fig. 2 shows the application of the invention to a similar wheel which however is provided with a metal rim adapted for the attachment of a pneumatic tire of the usual type. Fig. 3 shows the application of the invention to a wheel having a metal rim only. Fig. 4 shows the application of the invention to a wheel having a broad tread. Fig. 5 shows a modification of the arrangement shown in Fig. 2.

Similar letters of reference denote like parts throughout the drawings.

Referring to Fig. 1, A is the wooden felly of a so-called artillery wheel made originally to suit the requirements of the present invention, the felly A being surrounded by a peripheral band B preferably shrunk on as usual. The wheel is provided with a pair of relatively deep side flanges C whose free edges c are directed towards one another so that the flanges embrace or overlap not merely the base but the body of the tire D laterally, and expose between their free edges c only the tread portion of the tire and the parts of the latter immediately adjacent to the tread. This tread portion normally projects beyond the flanges C to such a distance radially of the wheel as to enable the tire D, in ordinary working, to yield under the load without transferring the incidence of the load from the tire itself to the flanges, the depth of the flanges C being moreover made sufficient to prevent the tread and adjacent lateral portion of the tire, when deflated, or collapsed under an excessive load, from crushing the air tube $d$ against the band B, even if the edges c of the flanges should be brought in contact with the ground. Each of the flanges C is removable, and consists of an annular plate whose portion $C^1$ of lesser diameter is shaped transversely so as to constitute a cheek plate adapted to conform approximately to the contour of the corresponding face of the felly A against which it is applied and towards which it is drawn by means of a series of screw bolts E. The latter pass transversely through holes provided in the felly A, in the portions $C^1$ of both the flanges C, and in the marginal flaps $f$ of the tire cover which are clamped between the flanges and felly, the edges $b$ of the band B projecting beyond the faces of the felly so as to bite into the cover when the bolts E are tightened. The bolts E, by transfixing the flaps $f$, positively prevent creeping of the latter.

Those portions $g$ of the felly A, at each side, with which the flaps $f$ of the tire make contact and through which the bolts E extend, are made to project laterally, and the inner edges $h$ of the flanges are made of less diameter than the projecting portions $g$ of the felly and are bent towards one another, so that the flaps $f$ are caused to lap over and embrace the projecting portions $g$ of the felly in such manner as to become interlocked therewith. In order that the inturned inner edges $h$ of the flanges may be free to be drawn by the bolts E towards the felly sufficiently far to insure the flaps $f$ becoming tightly nipped between the flanges and felly, the edge $h$ of each flange is received in an annular groove of sufficient depth, provided on the corresponding face of the felly as indicated. By this construction, as well as by the lateral projection of the edges $b$ of the band B as already described, the felly or rim of the wheel is in effect provided on each lateral face with a circumferentially extending corrugation or corrugations with which the marginal flaps of the tire are caused by the pressure of the cheek plates $C^1$ to become interlocked.

Those portions of the flanges C which extend radially beyond the band B, are outwardly curved or bellied so as to extend laterally beyond, and afford protection to, the heads and nuts of the bolts E, their free edges $c$, which are strengthened by beadings, being inwardly curved towards one another so as to terminate at a distance apart approximately equal to the width of the band $b$. The edges $c$ of the flanges might however extend further towards one another, either in a direction substantially parallel to the band $b$, or even by being recurved towards the band, so as the more effectually to hold the tire. The outer face of the band $b$, which constitutes what may be termed the seat for the tire, is approximately tangential to the inner faces of the outwardly bellied portions of the flanges C so that the air tube $d$, when inflated, will encounter no sudden changes of contour in the surfaces with which it comes in contact.

The arrangement shown in Fig. 2 resembles that just described, but is designed to meet the requirements of a case wherein the invention is applied to a wheel already provided with a shrunk-on metal rim K having lateral flanges $k$ adapted to accommodate a pneumatic tire of the ordinary type. In this case the rim K may be retained, an annular band B being slipped over the flanges $k$ so as to rest thereon with its edges $b$ projecting slightly at both sides as shown. As the outwardly curved side flanges $k$ usually project, as indicated, laterally beyond the side faces $a$ of the felly A, these flanges serve to replace the projecting portions $g$ of the felly shown in Fig. 1, and the bolts E are passed through holes in the flanges $k$, so as to extend between the rim K and band B. In other respects the construction illustrated in Fig. 2 is the same as that described with reference to Fig. 1.

The arrangement shown in Fig. 3 is similar to that shown in Fig. 2, and is designed to meet the requirements of a case wherein the invention is applied to a wheel of the bicycle type, whose rim is entirely of metal and adapted to receive a pneumatic tire of the ordinary type. In this case the metal rim K with its lateral flanges $k$ is of necessity retained, an annular band B being (as in Fig. 2) slipped over the flanges $k$ so as to rest thereon with its edges $b$ projecting slightly at both sides as shown. The bolts E are passed through the holes in the flanges $k$, so as to extend between the rim K and band B, and there being no felly as in the cases previously described, the margins $f$ of the tire cover, and the inturned inner edges $h$ of the flanges C, are both free, when drawn towards one another from opposite sides, to pass over the rim K on that side thereof which is towards the center of the wheel.

Fig. 4 shows the application of the invention to a wheel having a broad tread and a wooden felly. In this case the construction is very similar to that described with reference to Fig. 1, a single pair of side flanges C and a single tire D being used, but the latter having (in the example illustrated) two tread portions J extending side by side in parallel annuli. The felly A might have a single broad peripheral band shrunk on as in Fig. 1, but in the example shown there are two narrow bands B¹ let into seatings at the outer corners of the felly and projecting from the respective lateral faces thereof so that their edges b are adapted to bite into the tire cover, as before, when the flanges C are drawn towards one another by the bolts E.

The use of two lateral bands B¹, as shown, permits of the central portion $a^1$ of the outer periphery of the felly being hollowed out as indicated, so as to be adapted (when the tire is collapsed) to receive the reëntrant portion n of the tire which lies between the tread portions J. Hence the distance to which the flanges C project radially beyond the outer periphery of the felly A, may be made correspondingly less than would otherwise be possible in view of the necessity of preventing the air tube d becoming crushed between the felly and tread when the wheel, with the tire collapsed, runs upon the edges c of the flanges C.

Between the tread portions J, the tire is encircled by a floating annular flexible band O of inextensible material of a diameter approximately equal to the maximum diameter of the flanges C. This band O, which lies in a groove p between the treads, and which is formed of stranded wire cord or thin wire rope or equivalent material, serves to prevent the mutally adjacent sides of the tread J from being blown outwards by the air pressure within the tire. At the same time the band O is capable of bending inwards locally when the wheel passes over an obstruction, the pressure within the tire serving to restore, and normally maintain, the circularity of the band.

In all cases the flanges C may be either of rolled or pressed metal as indicated in Figs. 1 and 4, or of cast metal (preferably steel) as indicated in Fig. 5. In the latter case radially disposed ribs may be provided as for example at $r \; r^1$ for the purpose of strengthening the castings. In any case it will be advisable to thicken or outwardly emboss the metal of each flange (as at q in each figure) where the bolts E pass through the flanges, the boss thus formed having a square hole to fit a squared portion on the neck of the bolt as indicated.

The tire covers used in connection with the present invention may be of any preferred construction, and are preferably made of a cross-sectional form adapted to conform to the shape indicated in the drawings. In the examples illustrated each tire cover is understood to be constituted by an inner wall S of canvas composed of several layers vulcanized together, and covered externally with a waterproof coating s of indiarubber. The side faces j of the projecting portion of the tire cover are made of such contour that, when the tread J is forced inwards, these faces will slide against, and maintain rubbing contact with, the beaded edges c of the flanges C, so as to prevent the entry of mud and dirt between the flanges and tire.

The treads J shown in Figs. 1, 3 and 4 are understood to be of leather with metal studs u projecting from the wearing surface, the side flaps t (more particularly in the case of Figs. 1 and 3) being adapted to encounter and take a bearing against the beaded edges c of the flanges C when the tire is compressed beyond the normal extent. These leather treads are each attached to a layer T of leather forming an outer protective covering for the tire and cemented or otherwise permanently attached thereto, the thinned margins of the layer T extending as far towards the edges of the tire cover itself as may be necessary to effectually shield the cover from the effects of frictional contact with the flanges C consequent on the continual alternate compression and expansion of each part of the tire around the circumference of the wheel during running.

The tread J shown in Fig. 2 is understood to be of india rubber cemented to the tire, and having thinned margins extending between the flanges and the sides of the tire as and for the purpose just described.

Fig. 5 illustrates a convenient method of attaching a removable wearing tread or an anti-skidding band L which is secured in position by its thinned marginal extensions or flaps l being tucked between the flanges C and the body of the tire, the flanges C being provided at intervals around the circumference of the wheel with holes adapted to receive outwardly projecting metal studs m which are riveted to the flaps l and are maintained in position in the holes by the air pressure within the tire. Obviously the holes and studs m should be so placed that the studs will not tend to leave the holes entirely when the tire is collapsed.

It is to be observed that with the constructions illustrated in Figs. 2, 3 and 5, the wheel is adapted to receive either a pair of flanges C and tire D as shown, or alternatively (as for example in the event of permanent or irreparable damage to the flanges or tire) a pneumatic tire of the usual type. Hence in the event of an irreparable accident happening to the flanges or tire of the present invention, in a locality where no means of replacing these parts exists, the flanges C and tire D may be detached and an ordinary pneumatic tire of corresponding diameter can be very readily fitted in place on the rim K.

Having now particularly described and ascertained the nature of the said invention and in what manner the same is to be performed, I declare that what I claim is:—

1. In a wheel provided with a pneumatic tire, the combination of a tire cover fastened to the sides of the wheel rim and having laterally extending hollow lobes situated radially beyond the point of attachment, a pair of side flanges gripping the said hollow lobes, and an inflatable inner tube confined between the cover and the wheel rim, in such manner that the internal pressure increases the grip of said lobes against the flanges, substantially as specified.

2. In a wheel provided with a pneumatic tire, the combination of a tire cover fastened to the sides of the wheel rim and having laterally extending hollow lobes situated radially beyond the point of attachment, a pair of side flanges gripping the said hollow lobes, and a circumferentially extending peripheral band secured to the rim and having its edges projecting beyond the sides of the rim and embedded in the tire cover.

3. In a wheel provided with a pneumatic tire, the combination of a tire cover fastened to the sides of the wheel rim and having laterally extending hollow lobes situated radially beyond the point of attachment, a pair of side flanges gripping the said hollow lobes, an inflatable inner tube confined between the cover and the wheel rim, and a tread band secured to the tire.

4. In a wheel provided with a pneumatic tire, the combination of a tire cover fastened to the sides of the wheel rim and having laterally extending hollow lobes situated radially beyond the point of attachment, a pair of side flanges gripping the said hollow lobes, an inflatable inner tube confined between the cover and the wheel rim, and a detachable tread band for the tire, said tread band being provided at its edges with beadings or projections adapted to engage the recesses or apertures of the said flanges, whereby the said band will be interlocked between the tire and flanges.

HORACE WALTER DOVER.

Witnesses:
GEORGE E. MINTERN,
WILLIAM G. E. DAVIES.